(12) United States Patent
Hirose et al.

(10) Patent No.: US 6,793,153 B2
(45) Date of Patent: Sep. 21, 2004

(54) STRUCTURE FOR MOUNTING HEADLAMP CLEANER

(75) Inventors: Hitoshi Hirose, Shizuoka (JP);
Hiromasa Takada, Shizuoka (JP);
Riichiro Miura, Shizuoka (JP);
Hiroaki Kimura, Shizuoka (JP);
Wataru Mizutani, Aichi (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 10/329,122

(22) Filed: Dec. 24, 2002

(65) Prior Publication Data

US 2003/0116645 A1 Jun. 26, 2003

(51) Int. Cl.[7] .................................. B05B 1/10
(52) U.S. Cl. ................................. 239/284.1
(58) Field of Search ................... 239/284.1, 284.2, 239/451, 455, 456, 458

(56) References Cited

U.S. PATENT DOCUMENTS

| | | | | |
|---|---|---|---|---|
| 3,641,613 A | * | 2/1972 | Povilaitis et al. | 15/250.02 |
| 3,704,481 A | * | 12/1972 | Fennell | 15/250.01 |
| 3,775,803 A | * | 12/1973 | Brumm et al. | 15/250.29 |
| 3,913,166 A | * | 10/1975 | Morrison | 15/250.01 |
| 3,999,278 A | * | 12/1976 | Loskill | 29/450 |
| 4,955,543 A | | 9/1990 | Orth et al. | |
| 5,073,722 A | * | 12/1991 | Tohge et al. | 307/10.1 |
| 5,762,271 A | * | 6/1998 | Lind et al. | 239/284.2 |
| 6,158,671 A | * | 12/2000 | Kodaira et al. | 239/284.2 |
| 2003/0066909 A1 | * | 4/2003 | Jenkins | 239/284.1 |

FOREIGN PATENT DOCUMENTS

| | | | |
|---|---|---|---|
| EP | 0 395 931 B1 | | 11/1990 |
| GB | 2304032 a | * | 3/1997 |
| GB | 2350284 a | * | 11/2000 |
| JP | 362244744 A | * | 10/1987 |
| JP | 403295741 A | * | 12/1991 |
| JP | 403295742 A | * | 12/1991 |
| JP | A 08- 058533 | | 3/1996 |
| JP | 02001301583 A | * | 10/2001 |
| JP | A-2001301583 A | | 10/2001 |
| JP | 02002037037 A | * | 2/2002 |

* cited by examiner

*Primary Examiner*—William E. Tapolcai
*Assistant Examiner*—Mohammad M. Ali
(74) *Attorney, Agent, or Firm*—Fish & Richardson P.C.

(57) ABSTRACT

There is provided a structure for mounting a headlamp cleaner including pistons having a nozzle cover and an injection nozzle at the front ends, and a cylinder for moving the pistons back and forth from a bumper. The cylinder is mounted in the bumper via a bracket having mating pieces which mate with a mounting hole provided in the bumper and positioning projections which are inserted into the mounting hole and used for positioning the bracket with respect to the planar horizontal direction.

11 Claims, 14 Drawing Sheets

STRUCTURE FOR MOUNTING HEADLAMP CLEANER

BACKGROUND OF THE INVENTION

1. Field of the Invention

The present invention relates to a novel structure for mounting a headlamp cleaner. More particularly, the present invention relates to the art of having a headlamp cleaner simply fixed to a bumper.

2. Description of the Related Art

There is a headlamp cleaner including pistons having a nozzle cover and an injection nozzle at the front ends, and a cylinder for moving the pistons back and forth with respect to a bumper. Such a headlamp cleaner is fixedly mounted inside a vehicle body with screws or the like and the pistons are moved in and out of an opening formed in the bumper. While the headlamp cleaner is not in use, that is, when a jet of washing liquid is not sent to the front cover of a headlamp, the nozzle cover is used to close the opening provided in the bumper tight from the outside.

As the conventional headlamp cleaner is not fixed to the bumper but fixedly mounted inside the vehicle body, there is a possibility of an error in mounting position with respect to the bumper unless care is taken to do the work of mounting the headlamp cleaner inside the vehicle body. In case the positional deviation with respect to the bumper is great, the pistons or the injection nozzle supported by the pistons may interfere with the bumper.

SUMMARY OF THE INVENTION

It is therefore an object of the invention to provide a structure for mounting a headlamp cleaner so arranged as to prevent the position of pistons from deviating from that of a bumper by providing means for mounting the headlamp cleaner inside the bumper and to facilitate the mounting of the headlamp cleaner in the bumper.

In order to solve the foregoing problems, according to the invention, there is provided a structure for mounting a headlamp cleaner including pistons having a nozzle cover and an injection nozzle at front ends and a cylinder for moving the pistons back and forth with respect to a bumper, wherein the cylinder is mounted in the bumper via a bracket having mating pieces which mate with a mounting hole provided in the bumper and positioning projections which are inserted into the mounting hole and used for positioning the bracket with respect to the planar horizontal direction.

In the structure for mounting a headlamp cleaner according to the invention, the cylinder is mounted in the bumper via the bracket and the positioning of the bracket with respect to the planar horizontal direction is carried out to ensure that the cylinder is positioned in the mounting hole of the bumper via the bracket, so that the pistons or the injection nozzle supported by the pistons never interfere with the bumper.

As the bracket is mounted in the bumper by mating the mating pieces provided in the bracket with the mounting hole of the bumper, the mounting of the cylinder in the bumper is facilitated.

In another structure for mounting a headlamp cleaner according to the invention, as the bracket fixed to the cylinder has mating pieces which mate with the mounting hole of the bumper and the bracket is mounted in the bumper via the elastic members, the repulsion force of the elastic members has an effect on the mating portions between the mounting condition of the bracket in the bumper is stabilized because the mating of the mating pieces with the mounting hole becomes hardly released.

Further, in order to solve the foregoing problems, according to the invention, there is provided a structure for mounting a headlamp cleaner including pistons having a nozzle cover and an injection nozzle at the front ends, and a cylinder for moving the pistons back and forth from a bumper, wherein the bumper is provided with a substantially rectangular mounting hole having rectangular mating cutouts; the cylinder is provided with a bracket having a rectangular cylindrical fixed contact end portion which is fixed to the mounting hole; pawl portions projecting outward from the mounting hole and mating with the edge faces of the mating cutouts are provided on a pair of sides out of four sides of the fixed contact end portion, and mating positioning portions having mating plate portions mating with the mating cutouts for positioning the mounting hole with respect to three planar directions are also provided on a pair of sides out of four sides of the fixed contact end portion; and another pair of sides having open width wider than that of the mounting hole are used as contact end portions for holding the bumper together with the pawl portions by directly contacting the inside of the mounting hole.

Therefore, in the structure for mounting a headlamp cleaner according to the invention, the bracket can be mounted in the bumper only by mating the pawl portions of the mating positioning portions with the edge faces of the mating cutouts of the mounting hole of the bumper. As the mating plate portions of the mating positioning portions are simultaneously mated with the mating cutouts so as to position the mounting hole in planar directions, the mounting and positioning of the headlamp cleaner of the headlamp cleaner can also be carries out simply and simultaneously.

Moreover, as the load applied to the bracket is received by the mating plate portions and the mating cutouts, the load applied to the pawl portions is reduced with the effect of making the pawl portions become hardly damaged.

BRIEF DESCRIPTION OF THE DRAWINGS

FIG. 16 is a perspective view of a bracket and a

DETAILED DESCRIPTION OF THE PREFERRED EMBODIMENTS

Figure 1:
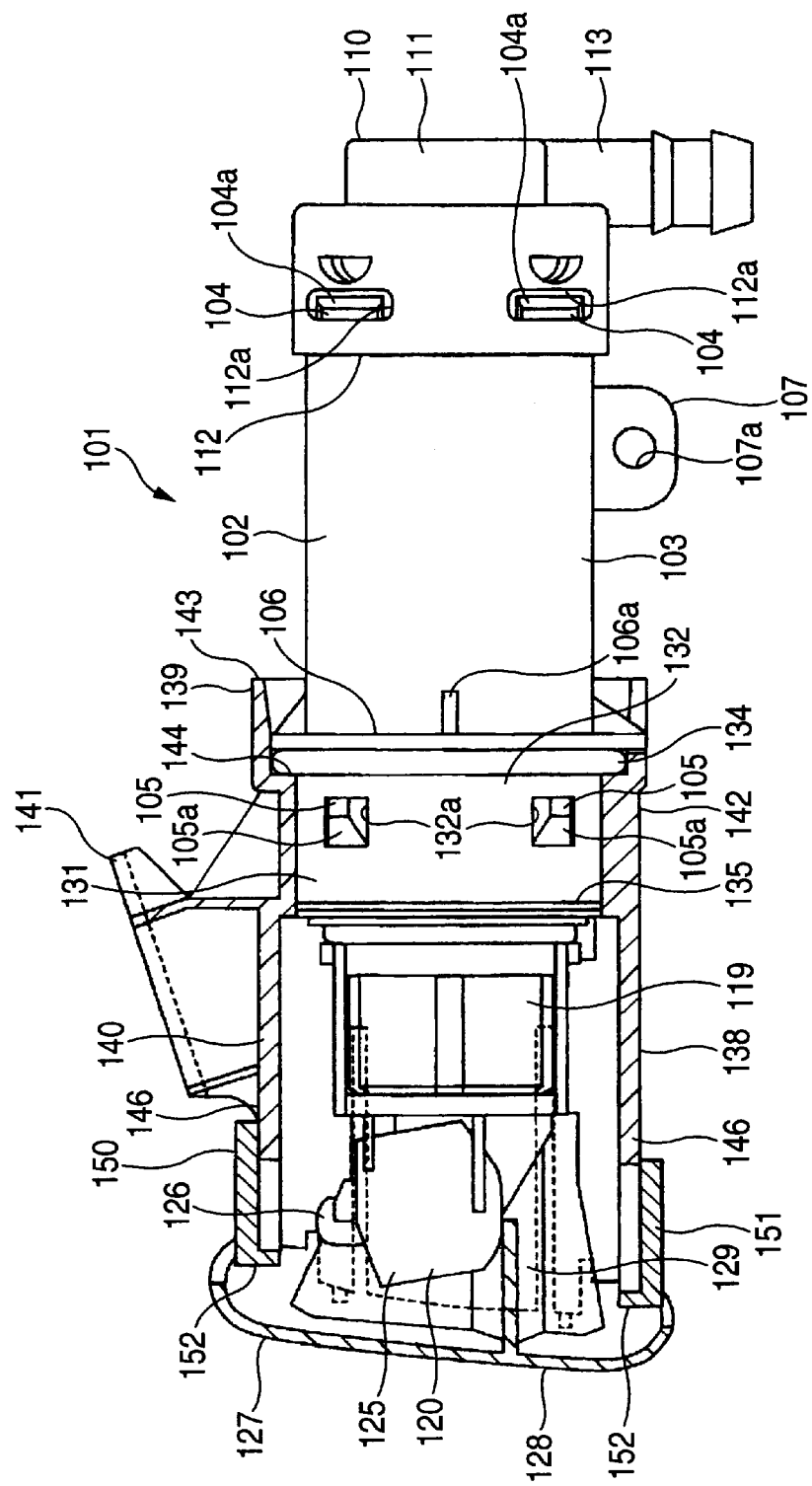
FIG. 1 is a partial cutaway side view of a headlamp cleaner according to the invention.

A first embodiment of a structure for mounting a headlamp cleaner embodying the invention will now be described by reference to the accompanying drawings.

First, the outline of a headlamp cleaner will be described.

A headlamp cleaner 101 has a shell cylinder 102. The shell cylinder 102 is formed by slidably joining together three cylinders so that the shell cylinder 102 as a whole is extensible and contractible.

A cylinder on the base edge side, that is, a cylinder (hereinafter called the 'base cylinder') 103 positioned on the outermost side out of the three cylinders forming the shell cylinder 102 is thickest and used as what is fixed to a vehicle body. Four mating projections 104, 104, ... are projected from the outer peripheral surface of the base edge portion of the base cylinder 103 at equal intervals in the circumferential direction. Further, a plurality of mating projections 105, 105, ... are projected from the outer peripheral surface of the front end portion of the base cylinder 103 at equal intervals in the circumferential direction. The rear end portions 104a, 104a, ... of the outer sides of the mating projections 104, 104, ... respectively have tilting surfaces displaced backward toward the center of the base cylinder 103, whereas the front end portions 105a, 105a, ... of the outer sides of the mating projections 105, 105, ... respectively have tilting surfaces displaced forward toward the center of the base cylinder 103 (see FIGS. 1 and 2).

A flange 106 extending over the whole periphery is provided in a protruding condition in a position separated slightly backward from the mating projections 105, 105, ... formed closer to the front end of the outer peripheral surface of the base cylinder 103 and a positioning projection 106a is provided in an extended condition from the outer peripheral surface of the flange 106. Moreover, a mounting piece 107 is provided in a projected condition in a position set slightly backward from the intermediate portion of the longitudinal outer peripheral surface of the base cylinder 103 with a screw insertion hole 107a formed in the mounting piece 107 (see FIG. 1).

An intermediate cylinder 108 is a cylinder slightly slenderer than the base cylinder 103 and slidably fitted into the base cylinder 103, the intermediate cylinder being called a first piston. A front end cylinder 109 is a cylinder slightly slenderer than the first piston 108 and slidably fitted into the first piston 108, the front end cylinder being called a second piston (see FIG. 2).

Reference numeral 110 denotes a back cap having a short cylindrical main portion 111 with its base being closed, a short cylindrical coupling portion 112 which is provided in a connected row arrangement and has a diameter greater than that of the main portion 111 and a coupling pipe portion 113 projecting from the side of the main portion 111, these being integrally formed. Four mating holes 112a, 112a, ... are formed in the side wall portion of the coupling portion 112 at equal intervals in the circumferential direction and a spring latching portion 114 is provided in the center of the inside of the base of the main portion 111 (see FIGS. 1 and 2).

Reference numeral 115 denotes a boot made of elastic material such as synthetic rubber and a flange 115b protruding outward is formed at the base edge of a bellows-like cylindrical main portion 115a. Moreover, a cylindrical portion 115c is provided in a connected row arrangement at the front end of the main portion 115a and a flange 115d protruding outward is formed at the front end of the cylindrical portion 115c (see FIG. 2).

The coupling portion 112 of the back cap 110 is outwardly fitted to the base edge portion of the base cylinder 103 and the mating projections 104, 104, ... of the base cylinder 103 are mated with the mating holes 112a, 112a, ... of the back cap 110, whereby the back cap 110 is combined with the base cylinder 103 so as to cover the base edge of the base cylinder 103. At this time, the flange 115b on the base edge side of the boot 115 is held between the base cylinder 103 and the back cap 110 (see FIGS. 1 and 2).

A top cap 116 is fitted to the front end portion of the second piston 109. The flange 115d on the front end side of the boot 115 is held between the top cap 116 and the second piston 109. Moreover, the top cap 116 is provided with a spring latch portion 116a (see FIG. 2).

Figure 2:
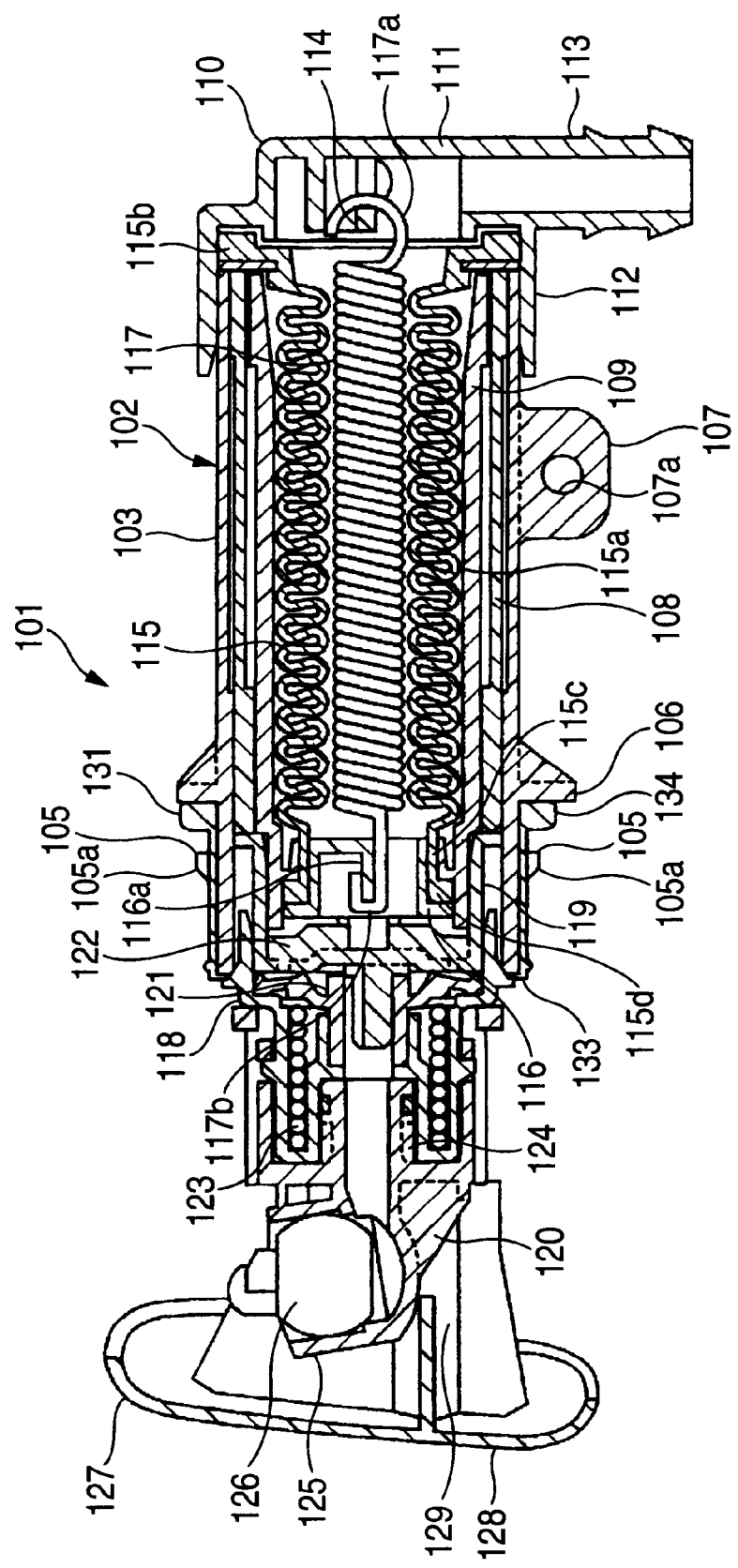
FIG. 2 is a vertical sectional view of a headlamp cleaner according to the invention.

Hook portions 117a and 117b on both sides of a helical tension spring 117 are latched onto the spring latch portion 114 of the back cap 110 and the spring latch portion 116a of the top cap 116 (see FIG. 2).

Figure 3:
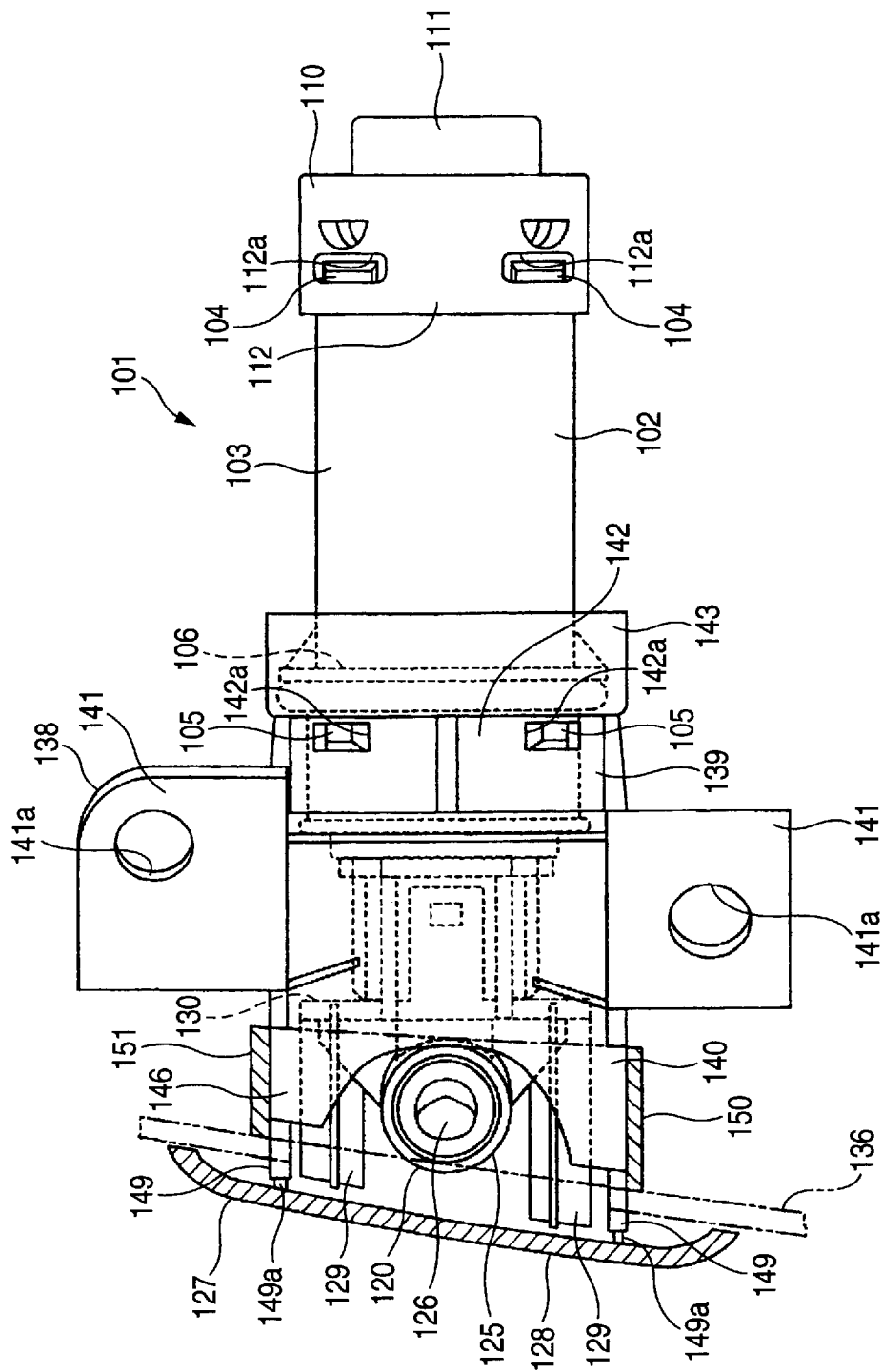
FIG. 3 is a partial cutaway plan view of a headlamp cleaner according to the invention.

When the helical tension spring 117 is provided in a tensioned condition between the two spring latch portions 114 and 116a, the pistons 108 and 109 are pulled by the contraction force of the helical tension spring 117 so that the pistons 108 and 109 are retracted into the base cylinder 103 in their non-operating condition as shown in FIGS. 1 to 3.

A injection-nozzle arranging portion 118 is provided in the front end portion of the second piston 109 (see FIG. 2).

The injection-nozzle arranging portion 118 has a check valve portion 119 and a nozzle holder 120.

Necessary valve elements are arranged within the check valve portion 119 to form a check valve 121, which may be of any type as long as it opens to make a passageway open from the base edge of the check valve portion 119 up to the front end thereof when the hydraulic pressure on the base edge side of the check valve portion 119 has a predetermined value or greater. For example, there may be adopted a closed valve such as described in JP-A-8-58533. Such a check valve 121 is characterized by having a diaphragm 122 made of elastic material for partitioning the fluid passageway from the base edge up to the front end of the check valve portion 119 into parts and a choke spring 123 in the form of a compression coil spring for holding the diaphragm 122 in a choking position. Thus, the choke spring 123 is compressed when the hydraulic pressure on the base edge side of the check valve portion 119 has the predetermined value or greater and causes the diaphragm 122 to be deformed, whereby the passageway closed by the diaphragm 122 is opened (see FIG. 2).

The nozzle holder 120 is mounted in the front end portion of the check valve portion 119 (see FIG. 2).

The nozzle holder 120 has a container portion 125 formed integrally with the front end of a coupling pipe 124. The container portion 125 is in the form of a cylinder with one end substantially closed and its closed end side is coupled to the front end of the coupling pipe 124 with its axial direction set perpendicular to the axial direction of the coupling pipe 124, the central hole of the coupling pipe 124 communicating with the internal space of the container portion 125. An injection nozzle 126 is tiltably fitted into the container portion 125. Further, the coupling pipe 124 is fixed to the front end portion of the check valve portion 119 in an internally fitted condition, whereby the nozzle holder 120 communicates with the inside of the shell cylinder 102 via the check valve 121 (see FIG. 2).

A nozzle cover 127 is attached to the nozzle holder 120. The nozzle cover 127 is formed integrally with a cover body 128 and stays 129 and 129 projected from the rear side of the cover body 128. While not in use, the opening of the cover body 128 with the nozzle holder 120 projected therethrough is kept closed and the cover body 128 is in the curved form adapted to conform to the curved configuration of a bumper. The rear ends of the stays 129 and 129 are fixed to the nozzle holder 120 with screws (FIGS. 1 and 2).

A dust cover 131 is attached to the front end portion of the base cylinder 103. The dust cover 131 is made of elastic material such as rubber or synthetic rubber and formed integrally with a cylindrical portion 132 having an internal diameter substantially equal to the external diameter of the front end portion of the base cylinder 103 and an inner flange portion 133 protruding inward from the front end of the cylindrical portion 132. The cylindrical portion 132 has a plurality of mating holes 132a and 132a formed at intervals in the circumferential direction (see FIGS. 1 and 2).

A protruded string 134 in the form of an O-ring is formed integrally with the rear end of the outer peripheral surface of the cylindrical portion 132 of the dust cover 131. A protruded string 135 is also formed over the whole circumference near the front end of the outer peripheral surface of the cylindrical portion 132 (see FIGS. 1 and 2).

Further, the cylindrical portion 132 of the dust cover 131 is outwardly fitted to the front end portion of the base cylinder 103. The mating projections 105, 105, . . . formed on the outer surface of the front end portion of the base cylinder 103 are mated with the mating holes 132a, 132a, . . . of the cylindrical portion 132 and joined to the front end portion of the base cylinder 103. Accordingly, the rear end of the cylindrical portion 132 is kept in contact with the front of the flange 106 formed in the front end portion of the base cylinder 103. The most parts of the mating projections 105, 105, . . . of the base cylinder 103 are kept in a projected condition from the outer side of the cylindrical portion 132 of the dust cover 131 (see FIGS. 1 and 2).

Therefore, the base cylinder 103 is supported by the vehicle body and the nozzle holder 120 is moved back and forth from a mounting hole 137 formed in the bumper 136. The mounting hole 137 is substantially rectangular with trapezoidal mating protrusions 137a and 137a formed on a pair of opposed edges. The corner portions 137b, 137b, . . . of the mounting hole 137 are formed into edges tilted at substantially 45° with respect to the opposed edges. A mounting bracket 138 is used for supporting the base cylinder 103 with the vehicle body (see FIGS. 7 and 8).

Figure 8:
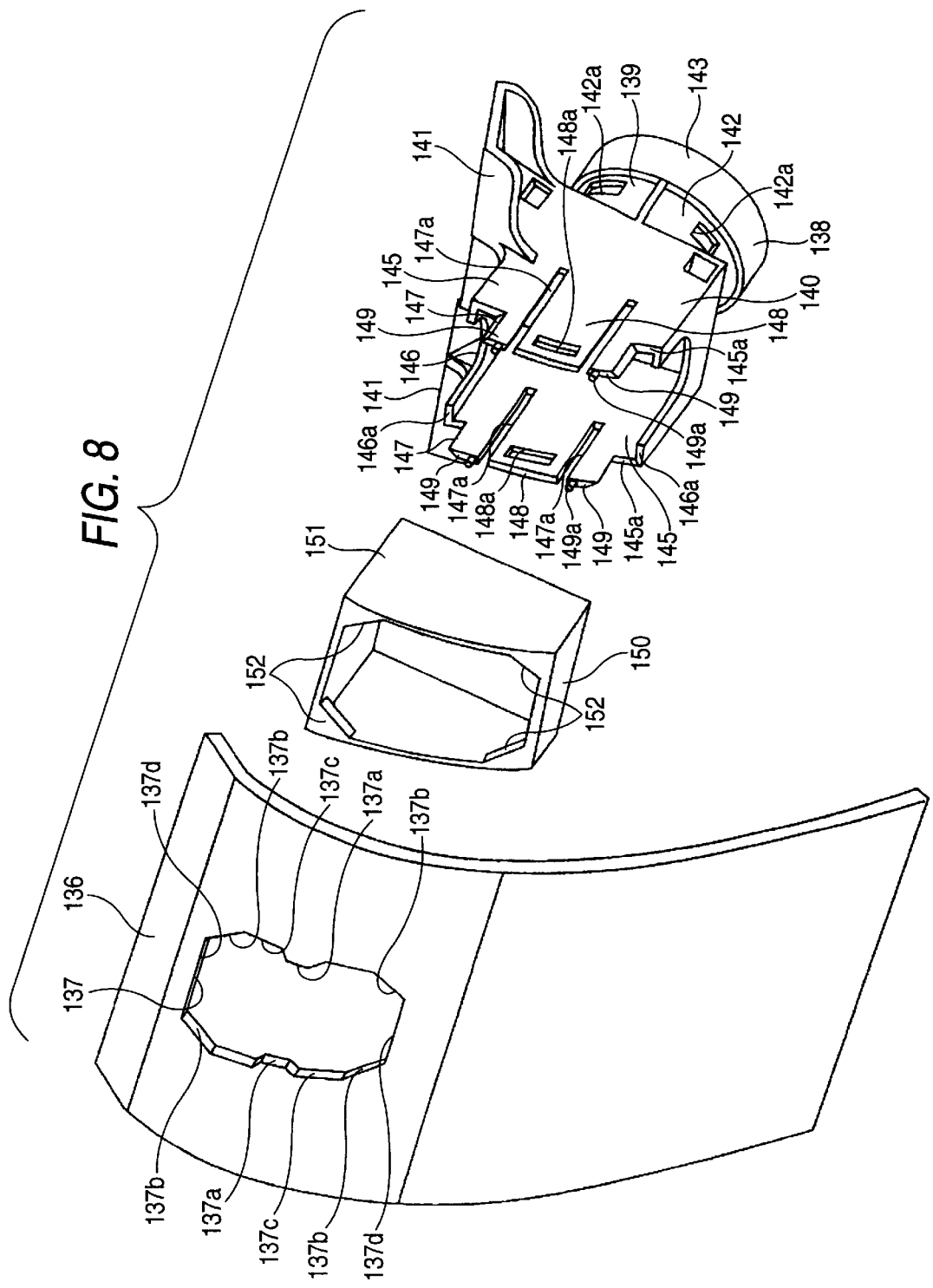
FIG. 8 is perspective views of a bracket, an elastic cover and a bumper that are separated from each other.
Figure 9:
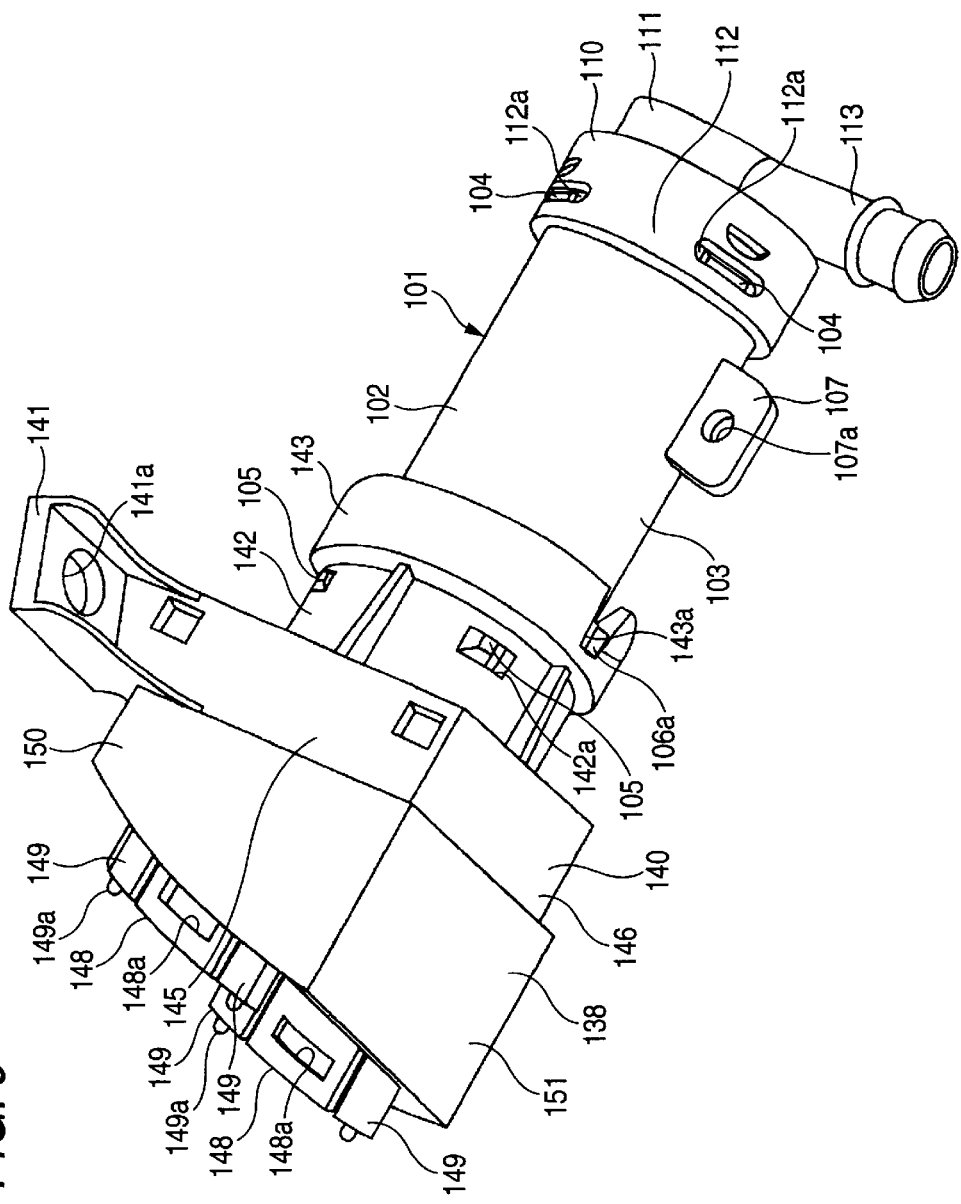
FIG. 9 is a perspective view of the headlamp cleaner in such a condition that the elastic cover is mounted on the bracket.

The bracket 138 is formed integrally with a substantially cylindrical support cylinder 139, a mating coupling end portion 140 in the form of a substantially rectangular cylinder projected forward from the support cylinder 139, and mounting pieces 141 and 141 projected sideways from the side portion of the mating coupling end portion 140. Screw insertion holes 141a and 141a are formed in the respective mounting pieces 141 and 141 (see FIGS. 8 and 9).

The support cylinder 139 has a first-half small diameter portion 142 and a second-half large diameter portion 143, and a stepped surface 144 directed backward is formed in the boundary portion between the two inner surfaces. Moreover, a plurality of mating holes 142a and 142a are formed at intervals in the circumferential direction of the small diameter portion 142, whereas a mating slit 143a opening in the rear end of the large diameter portion 43 is formed (see FIGS. 1, 3 and 8).

Figure 4:
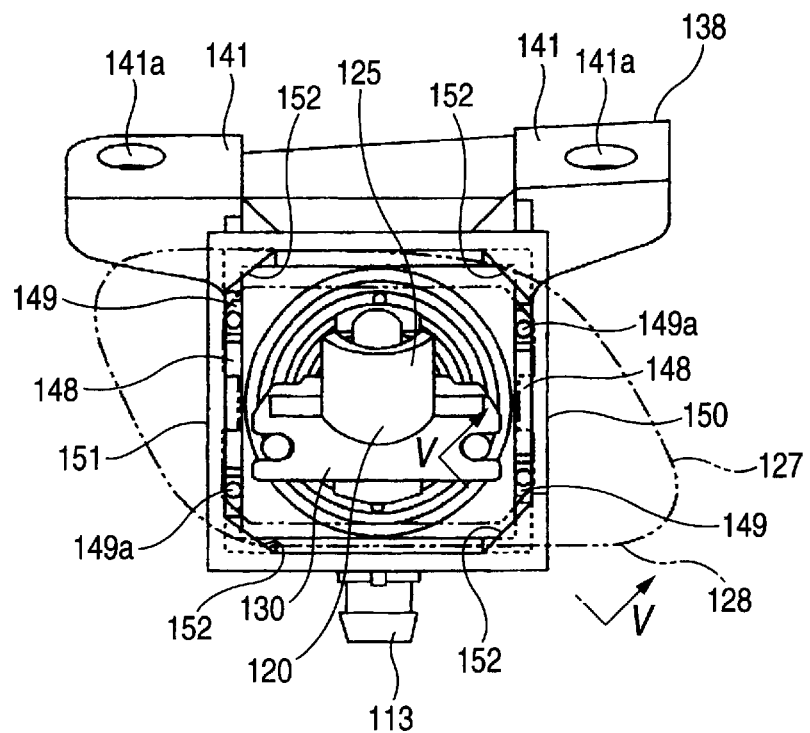
FIG. 4 is a partial cutaway elevational view of a headlamp cleaner according to the invention.

The mating coupling end portion 140 is in the form of an angular cylinder that is rectangular in transverse cross section, and projected pieces 147 and 147 projected forward are formed on a pair of opposed sides 145 and 145 excluding their end portions out of the four sides 145, 145, 146 and 146. Two lines of slits 147a and 147a reaching the front end of each projected piece 147 are formed therein and each of the elastic mating pieces 148 and 148 is formed between the two lines of slits 147a and 147a. Moreover, mating holes 148a and 148a extending in the width direction are formed in positions close to the respective tip ends of mating pieces 148 and 148. The width of each of the mating holes 148a and 148a is set equal to each of the mating protrusions 137a and 137a formed in the mounting hole 137 of the bumper 136 (see FIGS. 4 and 8).

Portions 149, 149, . . . out of the projected pieces 147 and 147 positioned on both the sides of the mating pieces 148 and 148 are used as projected positioning pieces. Small projections 149a, 149a, . . . are projected from the front ends of the projected positioning pieces 149, 149, . . . (see FIG. 8).

The space between the outer sides of one pair of sides 145 and 145 is set equal to the space between edges 137c and 137c, on which the mating protrusions 137a and 137a of the mounting hole 137 of the bumper 136 are formed. The space between the outer sides of the other pair of sides 146 and 146 is set slightly greater than the space between edges 137d and 137d without having the mating protrusions 137a and 137a of the mounting hole 137. Further, the space between the outer edges of the projected positioning pieces 149 and 149 is set equal to the width of the edge 137c of the mounting hole 137 of the bumper 136, that is the space between the corner portions 137b and 137b. The front end edges 145a and 145a in both sides portions of the pair of sides 145 and 145 and the front end edges 146a and 146a of the pair of sides 146 and 146 form continuous edges (see FIGS. 4 and 8).

An elastic cover 150 made of elastic material such as rubber or synthetic rubber is attached from the front end of the bracket 138. The elastic cover 150 is formed integrally with triangular elastic contact portions 152, 152, . . . on four corner portions of the front end opening of an angular cylindrical main portion 151 whose inner diameter is equal to the outer diameter of the mating coupling end portion 140 of the bracket 138 (see FIG. 8).

The elastic cover 150 is attached outwardly from the front side of the mating coupling end portion 140 of the bracket 138. More specifically, the main portion 151 of the elastic cover 150 is outwardly and airtightly attached to the outside of the respective sides 145, 145, 146 and 146 of the mating coupling end portion 140, and the elastic contact portions 152, 152, . . . are forwardly brought into contact with the coupling corner portions of the front end edges 145a, 145a, 146a and 146a of the respective sides 145, 145, 146 and 146. The mating pieces 148 and 148 and the projected positioning pieces 149 and 149 are in such a condition that they project forward from the front end of the elastic cover 150, that is, the mating holes 148a and 148a of the mating pieces 148 and 148 in particular are positioned on the front side from the front end of the elastic cover 150 (see FIG. 9).

Then the front end portion of the base cylinder 103 of the headlamp cleaner 101 is inserted from behind into the support cylinder 139 of the bracket. When the front end of the base cylinder 103 is inserted into the small-diameter portion 142 of the support cylinder 139, the protruded string 135 is squeezed out of shape by the inner peripheral surface of the small diameter portion 142 of the support cylinder 139 since the outer diameter of the protruded string 135 at the front end of the cylindrical portion 132 of the dust cover 131 is greater than the inner diameter of the small diameter portion 142 of the support cylinder 139, and the front end portion of the base cylinder 103 is inserted into the support cylinder 139 further. Ultimately, the mating projections 105, 105, formed in the front end portion of the base cylinder 103 mate with the respective mating holes 132a, 132a, . . . of the support cylinder 139, whereby the bracket 138 is supported by the front end portion of the base cylinder 103. In this condition, the O-ring-like protruded string 134 formed at the rear end of the cylindrical portion 132 of the dust cover 131 is forced to contact the stepped surface 144 formed on the inner peripheral surface of the support cylinder 139 of the bracket 138. Consequently, as the space between the support cylinder 139 of the bracket 138 and the front end portion of the base cylinder 103 is such that the protruded string 135 in the front end portion of the dust cover 131 is forced to contact the inner peripheral surface of the support cylinder 139 and that the O-ring-like protruded string 134 at the rear end of the dust cover 131 is caused to elastically contact the stepped surface 144 of the support cylinder 139, any backlash between the base cylinder 103 and the support cylinder 139 of the bracket 138 is prevented (see FIGS. 1 and 2).

In this case, the positioning projection 106a of the base cylinder 103 is mated with the mating slit 143a of the bracket 138, so that the positioning of the bracket 138 of the headlamp cleaner 101 with respect to the rotational direction is carried out (see FIG. 3).

The headlamp cleaner 101 is mounted in the bumper 136 in the following way; incidentally, the nozzle holder 120 is removed before the mounting work is done.

Figure 5:
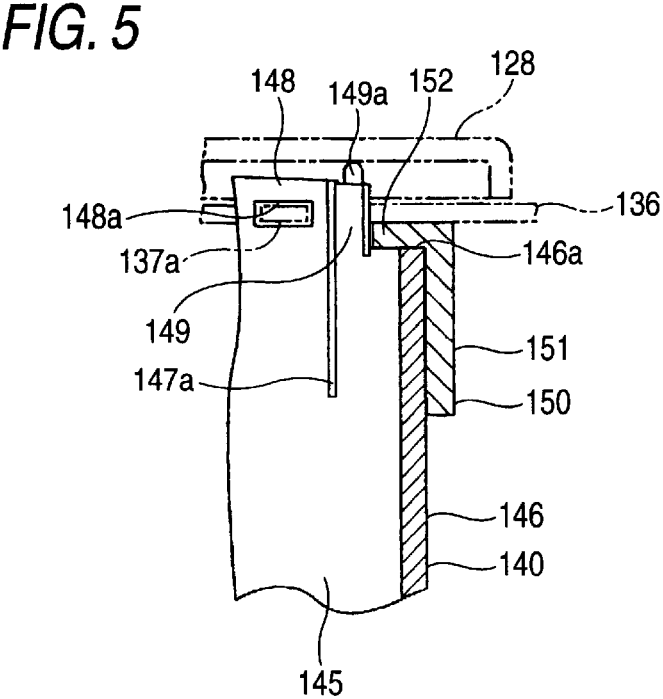
FIG. 5 is an enlarged sectional view taken on line V—V of FIG. 4.
Figure 6:
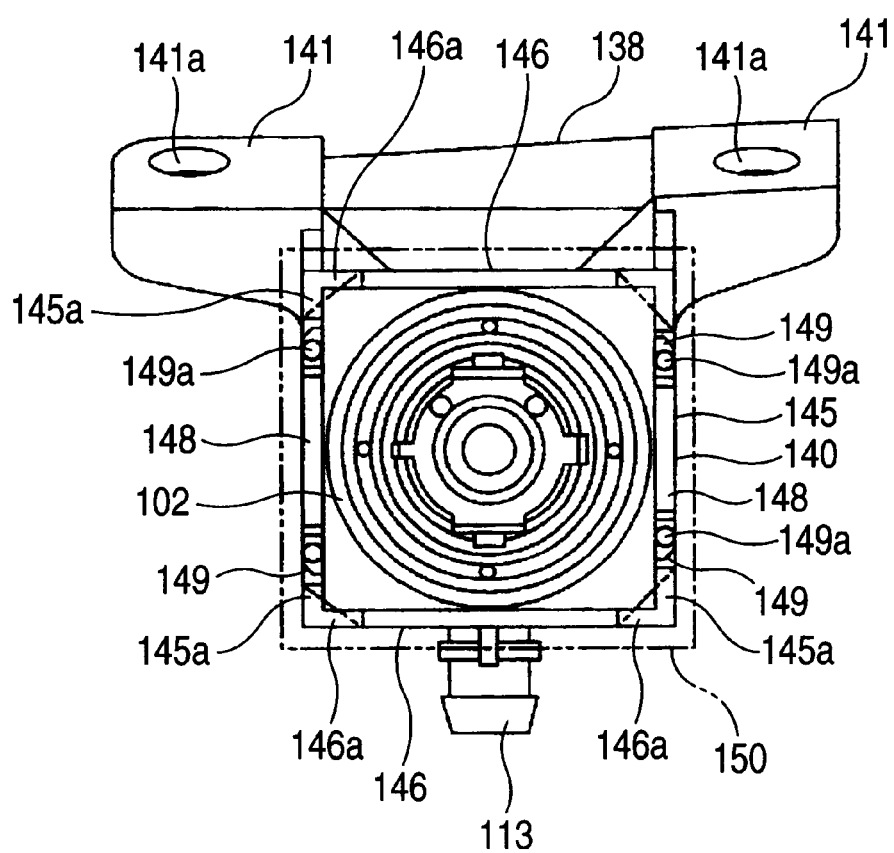
FIG. 6 is an elevational view with a nozzle holder removed.

The mating pieces 148 and 148 of the mating coupling end portion 140 of the bracket 138 are bent with the front ends thereof positioned close to each other before being inserted from behind inside the mating protrusions 137a and 137a of the mounting hole 137 of the bumper 136. At this time, the projected positioning pieces 149, 149, . . . positioned on both sides of the mating pieces 148 and 148 are brought into contact with the coupling portion between the corner portions 137b, 137b, . . . of the mounting hole 137 and the respective edges 137c and 137c, so that the mating coupling end portion 140 is positioned with respect to the mounting hole 137 (see FIG. 4). When the mating holes 148a and 148a of the mating pieces 148 and 148 positionally correspond to the mating protrusions 137a and 137a of the mounting hole 137, the force of bending the mating pieces 148 and 148 is removed so as to make the mating protrusions 137a and 137a mate with the mating holes 148a and 148a as the mating pieces 148 and 148 are restored to the original condition (see FIG. 2). Simultaneously, the elastic contact portions 152, 152, . . . of the elastic cover 150 are compressed in between the coupling corner portions of the front end edges 145a, 145a, 146a and 146a of the respective sides 145, 145, 146 and 146 of the mating coupling end portion 140 and the corner portions 137b, 137b, . . . of the mounting hole 137 (see FIG. 5).

Thus, the headlamp cleaner 101 is mounted in the mounting hole 137 of the bumper 136 via the bracket 138. Since the elastic contact portions 152, 152, . . . of the elastic cover 150 are compressed in between the coupling corner portions of the front end edges 145a, 145a, 146a and 146a of the respective sides 145, 145, 146 and 146 of the mating coupling end portion 140 and the corner portions 137b, 137b, . . . of the mounting hole 137 as described above, the repulsion force stored by the compression in the elastic contact portions 152, 152, . . . acts on the mating portions between the mating holes 148a and 148a of the mating pieces 148 and 148, so that the mating of both of them becomes hardly released.

The nozzle holder 120 fitted with the nozzle cover 127 is mounted by fitting the nozzle holder into the front end portion of the check valve portion 119 after the headlamp cleaner 101 is thus mounted in the bumper 136.

Figure 7:
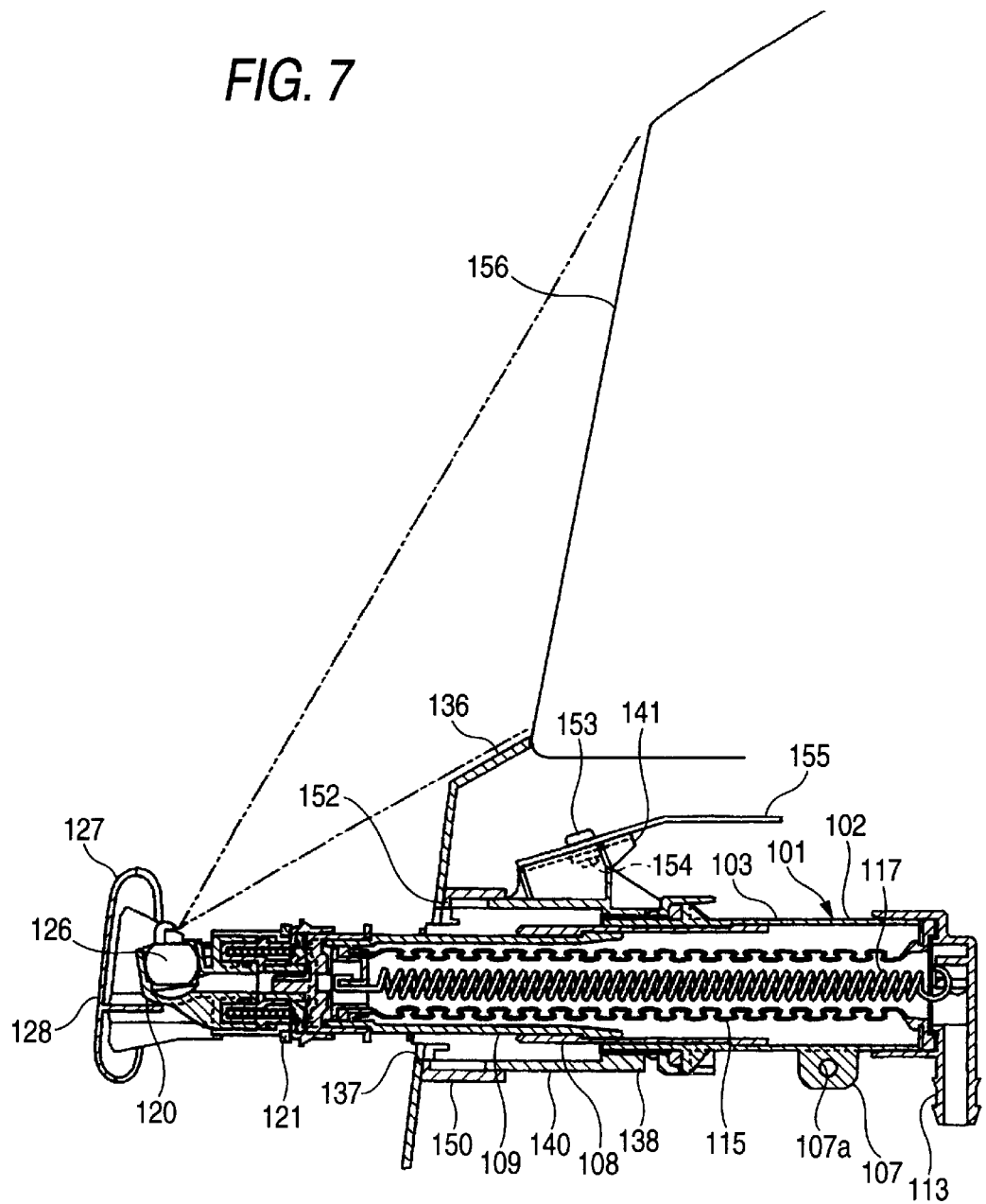
FIG. 7 is a vertical sectional view in an operating condition.

Then the mounting pieces 141 and 141 of the bracket 138 are fixed to part 155 of the vehicle body with mounting screws 153 and 153 passed through the screw insertion holes 141a and 141a and nuts 154 and 154 screwed onto the mounting screws 153 and 153 (see FIG. 7). Moreover, a mounting piece 107 formed on the base cylinder 103 is fixed to another part of the vehicle body with a mounting screw (not shown) passed through the screw insertion hole 107a and a nut screwed onto the mounting screw.

Further, the headlamp cleaner 101 is fixed to the vehicle body with the front end of the piston 109 and the injection nozzle 126 positioned with respect to the mounting hole 137 of the bumper 136.

In a retracted condition, as shown in FIG. 2, the pistons 108 and 109 are retracted into the base cylinder 103 by tensile force due to the contraction of the helical tension spring 117 and the nozzle holder 120 is positioned inside the mounting hole 137 of the bumper 136, so that the mounting hole 137 of the bumper 136 is covered with the cover body 128 of the nozzle cover 127. In this case, the inside of the cover body 128 of the nozzle cover 127 is brought into contact with the small projections 149a, 149a, . . . projected at the front end of the projected positioning pieces 149, 149, . . . of the mating coupling end portion 140 of the bracket 138, whereby a small gap is provided between the peripheral edge portion of the cover body 128 and the front of the bumper 136 (see FIG. 2). The coupling pipe portion 113 provided in the base edge portion of the base cylinder 103 is coupled to a motor pump (not shown), so that washing liquid is supplied by the motor pump to the base cylinder 103 via the coupling pipe portion 113 during the operation. The washing liquid thus supplied is passed through the boot 115 to reach the base edge portion of the check valve portion 119.

When the liquid pressure increases after the cleaning liquid is supplied into the base cylinder 103, the helical tension spring 117 is elongated by the liquid pressure and the first and second pistons 108 and 109 are projected from the base cylinder 103. Thus, the pistons 108 and 109 are extended up to a condition shown in FIG. 7, so that the injection nozzle 126 is allowed to reach a position where it is fit for use in washing the front cover 156 of the headlamp.

When the pressure of the washing liquid in the base edge portion of the check valve portion 119, that is, the liquid pressure applied to the diaphragm 122 has a predetermined value or greater, the choke spring 123 is compressed and the diaphragm 122 is deformed. Then the check valve 121 is opened and the washing liquid is jetted out of the injection nozzle 126 via the nozzle holder 120 toward the front cover 156 of the headlamp (see FIG. 7).

When the washing liquid is thus supplied, the shell cylinder 102 extends and the check valve 121 opens whereby to cause the washing liquid to be jetted out of the injection nozzle 126. Therefore, the spring force of the choke spring 123 is set lower than that of the helical tension spring 117. In this case, the washing liquid is not necessarily needed to be jetted out after the shell cylinder 102 is completely extended but may be jetted out while the shell cylinder 102 is extending as well.

As the liquid pressure lowers when the supply of the washing liquid is stopped, the check valve 121 is closed and the shell cylinder 102 contracts in the retracted condition shown in FIG. 2. Moreover, the mounting hole 137 of the bumper 136 is closed with the cover body 128 of the nozzle cover 127 provided to the nozzle holder 120.

In the structure for mounting a headlamp cleaner above, the headlamp cleaner 101 is fixed to the bumper 136 by fixing, to the mounting hole 137 of the bumper 136, the mating coupling end portion 140 of the bracket 138 positionally fixed to the headlamp cleaner 101 accurately to ensure that the front end portions of the pistons 108 and 109 and the injection nozzles 126 are properly positioned with respect to the mounting hole 137 of the bumper 136. Consequently, there is no fear of bringing the pistons 108 and 109 and the injection nozzle 126 into contact with the bumper 136.

The mating coupling end portion 140 of the bracket 138 can be fixed to the bumper 136 through only the simple work of joining the mating holes 148a and 148a of the mating pieces 148 and 148 to the mating protrusions 137a and 137a of the mounting hole 137 of the bumper 136. Since this is the work of joining the mating holes 148a and 148a to the mating protrusions 137a and 137a, their longitudinal movement in the mating portions is regulated and also their longitudinal positioning is simultaneously carried out.

As the projected positioning pieces 149 and 149 provided on both sides of the mating pieces 148 and 148 in the mating coupling end portion 140 of the bracket 138 mate with the mounting hole 137 of the bumper 136, the positioning of the mating coupling end portion 140 in the direction of the opening plane of the mounting hole 137 is carried out for certain. Moreover, the load applied to the bracket 138 at the time the bracket 138 is mounted in the bumper 136 is received by the projected positioning pieces 149 and 149 and the mounting hole 137, so that the load applied to the mating pieces 148 and 148 is reduced with the effect of making the mating pieces 148 and 148 become hardly damaged.

Further, the slits 147a, 14a, . . . are formed on the sides 145 and 145 where the mating pieces 148 and 148 of the mating coupling end portion 140 are provided, whereby the elastic deformation of the mating pieces 148 and 148 in their planar direction is facilitated; therefore, it becomes easy to join the mating holes 148a and 148a provided to the mating pieces 148 and 148 to the mating protrusions 137a and 137a of the bumper 136.

A second embodiment of a structure for mounting a headlamp cleaner embodying the invention will now be described by reference to the accompanying drawings.

First, the outline of a headlamp cleaner will be described.

A headlamp cleaner 201 has a shell cylinder 202. The shell cylinder 202 is formed by slidably joining together three cylinders so that the shell cylinder 202 as a whole is extensible and contractible.

A cylinder on the base edge side, that is, a cylinder (hereinafter called the 'base cylinder') 203 positioned on the outermost side out of the three cylinders forming the shell cylinder 202 is thickest and used as what is fixed to a vehicle body. Four mating projections 204, 204, . . . are projected from the outer peripheral surface of the base edge portion of the base cylinder 203 at equal intervals in the circumferential direction. Further, a plurality of mating projections 205, 205, . . . are projected from the outer peripheral surface of the front end portion of the base cylinder 203 at equal intervals in the circumferential direction. The rear end portions 204a, 204a, . . . of the outer sides of the mating projections 204, 204, . . . respectively have tilting surfaces displaced backward toward the center of the base cylinder 203, whereas the front end portions 205a, 205a, . . . of the outer sides of the mating projections 205, 205, . . . respectively have tilting surfaces displaced forward toward the center of the base cylinder 203 (see FIGS. 10 and 11).

A flange 206 extending over the whole periphery is provided in a protruding condition in a position separated slightly backward from the mating projections 205, 205, . . . formed closer to the front end of the outer peripheral surface of the base cylinder 203 and a positioning projection 206a is provided in an extended condition from the outer peripheral surface of the flange 206. Moreover, a mounting piece 207 is provided in a projected condition in a position set slightly backward from the intermediate portion of the longitudinal outer peripheral surface of the base cylinder 203 with a screw insertion hole 207a formed in the mounting piece 207 (see FIG. 10).

An intermediate cylinder 208 is a cylinder slightly slenderer than the base cylinder 203 and slidably fitted into the base cylinder 203, the intermediate cylinder being called a first piston. A front end cylinder 209 is a cylinder slightly slenderer than the first piston 208 and slidably fitted into the first piston 208, the front end cylinder being called a second piston (see FIG. 11).

Reference numeral 210 denotes a back cap having a short cylindrical main portion 211 with its base being closed, a short cylindrical coupling portion 212 which is provided in a connected row arrangement and has a diameter greater than that of the main portion 211 and a coupling pipe portion 213 projecting from the side of the main portion 211, these being integrally formed. Four mating holes 212a, 212a, . . . are formed in the side wall portion of the coupling portion 212 at equal intervals in the circumferential direction and a spring latching portion 214 is formed in the center of the inside of the base of the main portion 211 (see FIGS. 10 and 11).

Reference numeral 215 denotes a boot made of elastic material such as synthetic rubber and a flange 215b protruding outward is formed at the base edge of a bellows-like cylindrical main portion 215a. Moreover, a cylindrical portion 215c is provided in a connected row arrangement at the front end of the main portion 215a and a flange 215d protruding outward is formed at the front end of the cylindrical portion 215c (see FIG. 11).

The coupling portion 212 of the back cap 210 is outwardly fitted to the base edge portion of the base cylinder 203 and the mating projections 204, 204, . . . of the base cylinder 203 are mated with the mating holes 212a, 212a, . . . of the back cap 210, whereby the back cap 210 is combined with the base cylinder 203 so as to cover the base edge of the base cylinder 203. At this time, the flange 215b on the base edge side of the boot 215 is held between the base cylinder 203 and the back cap 210 (see FIGS. 10 and 11).

A top cap 216 is fitted to the front end portion of the second piston 209. The flange 215d on the front end side of the boot 215 is held between the top cap 216 and the second piston 209. Moreover, the top cap 216 is provided with a spring latch portion 216a (see FIG. 11).

Figure 10:
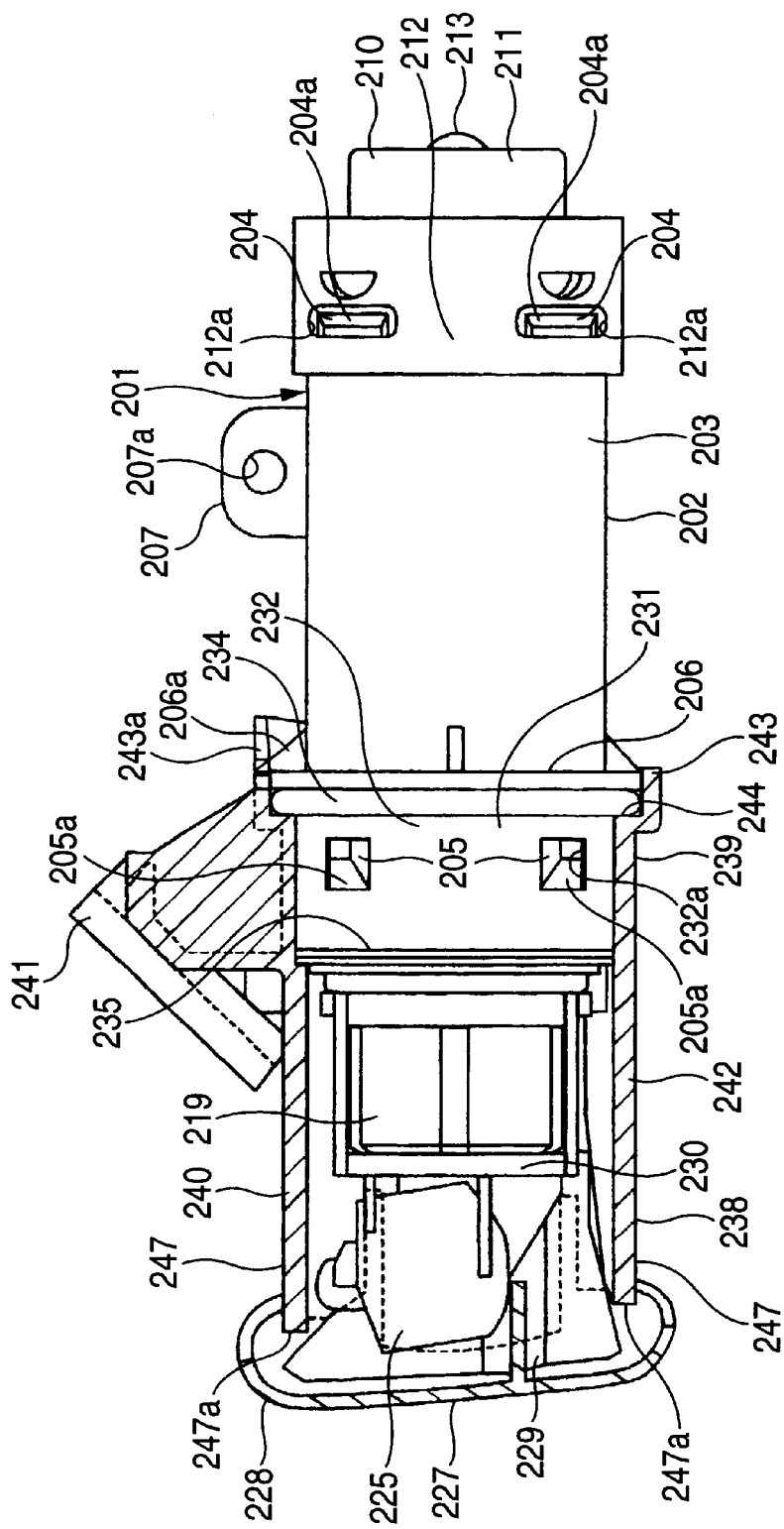
FIG. 10 is a partial cutaway side view of a headlamp cleaner embodying the invention.
Figure 11:
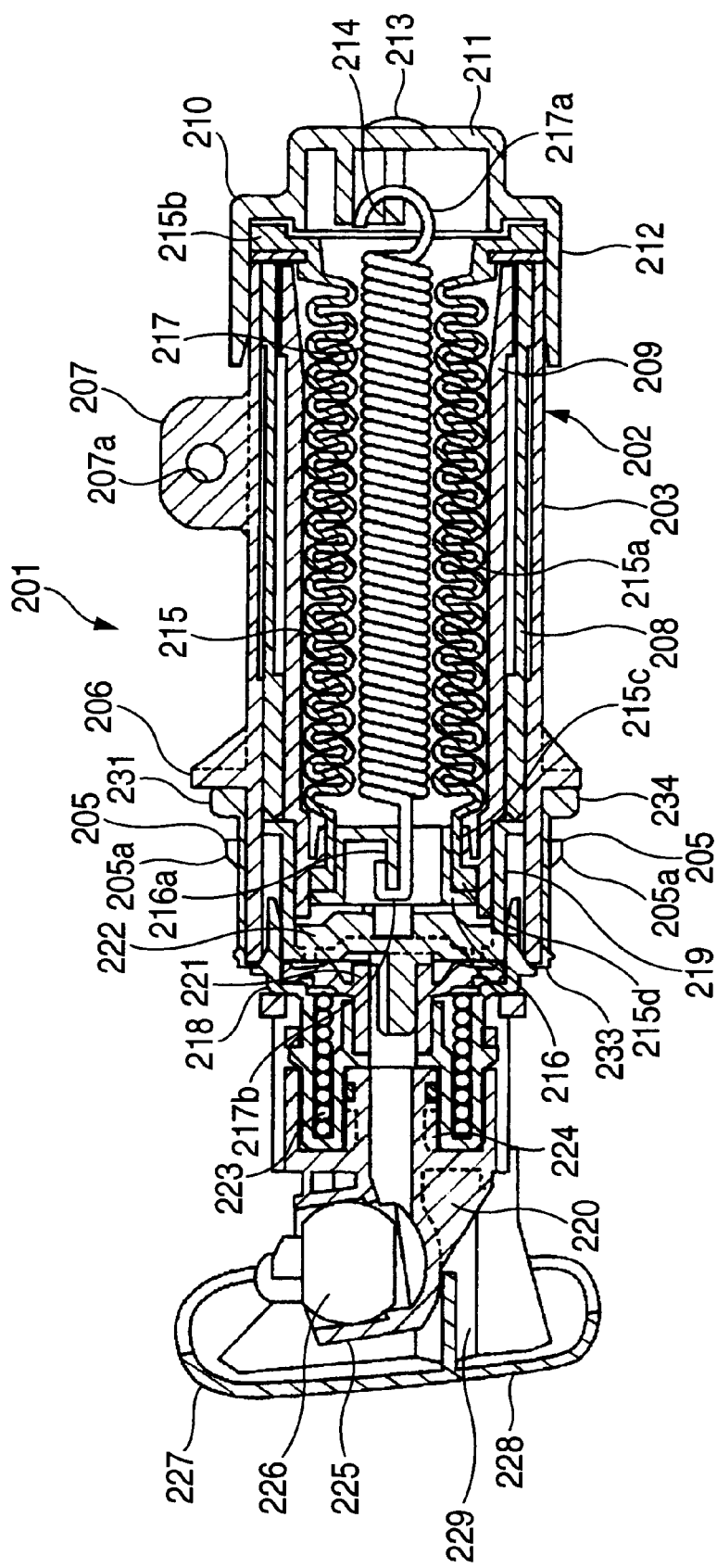
FIG. 11 is a vertical sectional view of a headlamp cleaner embodying the invention.
Figure 12:
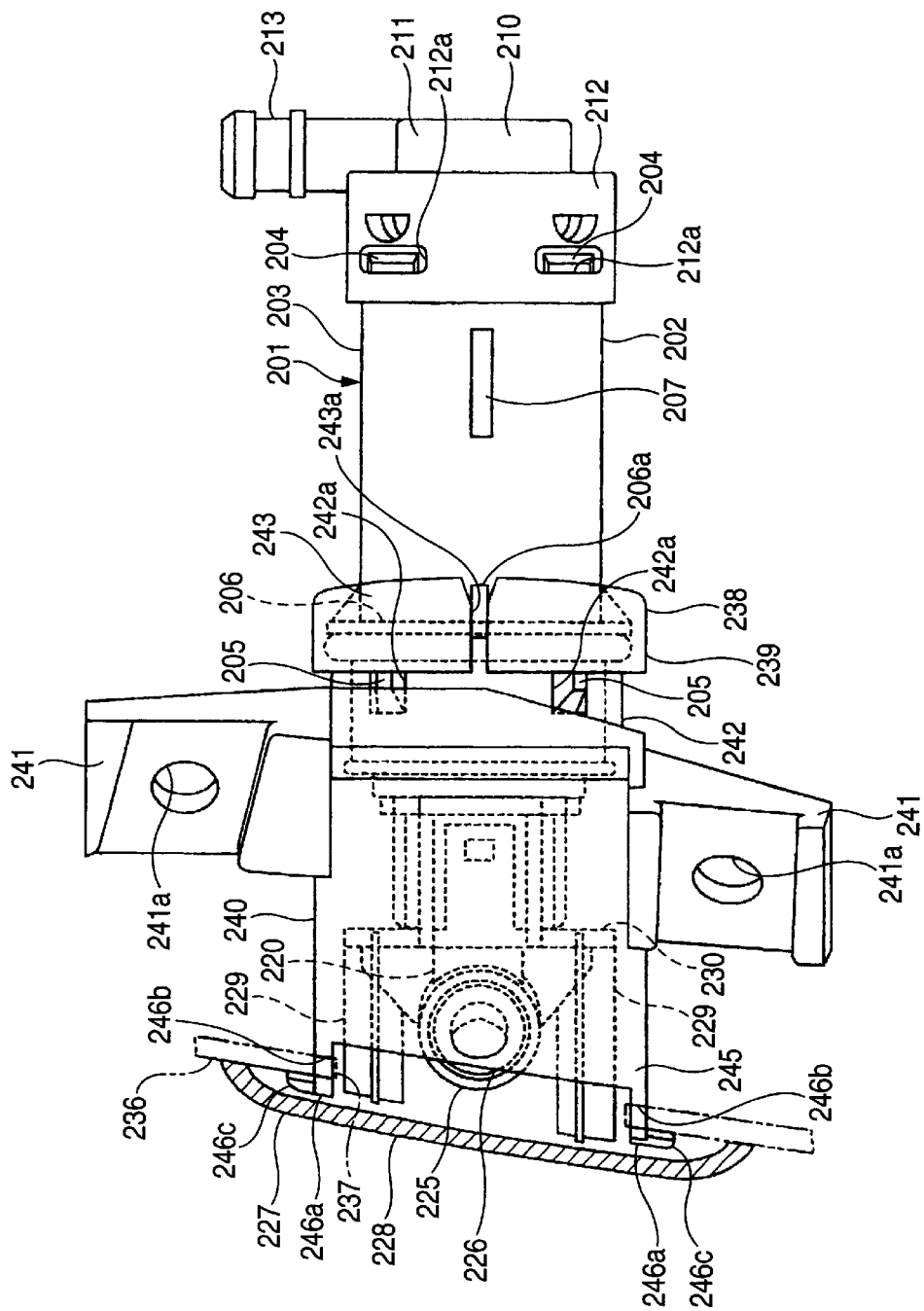
FIG. 12 is a partial cutaway plan view of a headlamp cleaner embodying the invention.

Hook portions 217a and 217b on both sides of a helical tension spring 217 are latched onto the spring latch portion 214 of the back cap 210 and the spring latch portion 216a of the top cap 216 (see FIG. 21).

when the helical tension spring 217 is provided in a tensioned condition between the two spring latch portions 214 and 216a, the pistons 208 and 209 are pulled by the contraction force of the helical tension spring 217 so that the pistons 208 and 209 are retracted into the base cylinder 203 in their non-operating condition as shown in FIGS. 10 to 12.

A injection-nozzle arranging portion 218 is provided in the front end portion of the second piston 209 (see FIG. 11).

The injection-nozzle arranging portion 218 has a check valve portion 219 and a nozzle holder 220.

Necessary valve elements are arranged within the check valve portion 219 to form a check valve 221, which may be of any type as long as it opens to make a passageway open from the base edge of the check valve portion 219 up to the front end thereof when the hydraulic pressure on the base edge side of the check valve portion 219 has a predetermined value or greater. For example, there may be adopted a closed valve such as described in JP-A-8-58533. Such a check valve 221 is characterized by having a diaphragm 222 made of elastic material for partitioning the fluid passageway from the base edge up to the front end of the check valve portion 219 into parts and a choke spring 223 in the form of a compression coil spring for holding the diaphragm 222 in a choking position. Thus, the choke spring 223 is compressed when the hydraulic pressure on the base edge side of the check valve portion 219 has the predetermined value or greater and causes the diaphragm 222 to be deformed, whereby the passageway closed by the diaphragm 222 is opened (see FIG. 11).

The nozzle holder 220 is mounted in the front end portion of the check valve portion 219 (see FIG. 11).

The nozzle holder 220 has a container portion 225 formed integrally with the front end of a coupling pipe 224. The container portion 225 is in the form of a cylinder with one end substantially closed and its closed end side is coupled to the front end of the coupling pipe 224 with its axial direction set perpendicular to the axial direction of the coupling pipe 224, the central hole of the coupling pipe 224 communicating with the internal space of the container portion 225. An injection nozzle 226 is tiltably fitted into the container portion 225. Further, the coupling pipe 224 is fixed to the front end portion of the check valve portion 219 in an internally fitted condition, whereby the nozzle holder 220 communicates with the inside of the shell cylinder 202 via the check valve 221 (see FIG. 11).

A nozzle cover 227 is attached to the nozzle holder 220. The nozzle cover 227 is formed integrally with a cover body 228 and stays 229 and 229 projected from the rear side of the cover body 228. While not in use, the opening of the cover body 228 with the nozzle holder 220 projected therethrough is kept closed and the cover body 228 is in the curved form adapted to conform to the curved configuration of a bumper. The rear ends of the stays 229 and 229 are fixed to the nozzle holder 220 with screws (FIGS. 10 and 11).

A dust cover 231 is attached to the front end portion of the base cylinder 203. The dust cover 231 is made of elastic material such as rubber or synthetic rubber and formed integrally with a cylindrical portion 232 having an internal diameter substantially equal to the external diameter of the front end portion of the base cylinder 203 and an inner flange portion 233 protruding inward from the front end of the cylindrical portion 232. The cylindrical portion 232 has a plurality of mating holes 232a and 232a formed at intervals in the circumferential direction (see FIGS. 10 and 11).

A protruded string 234 in the form of an O-ring is formed integrally with the rear end of the outer peripheral surface of the cylindrical portion 232 of the dust cover 231. A protruded string 235 is also formed over the whole circumference near the front end of the outer peripheral surface of the cylindrical portion 232 (see FIGS. 10 and 11).

Further, the cylindrical portion 232 of the dust cover 231 is outwardly fitted to the front end portion of the base cylinder 203. The mating projections 205, 205, . . . formed on the outer surface of the front end portion of the base cylinder 203 are mated with the mating holes 232a, 232a, . . . of the cylindrical portion 232 and joined to the front end portion of the base cylinder 203. Accordingly, the rear end of the cylindrical portion 232 is kept in contact with the front of the flange 206 formed in the front end portion of the base cylinder 203. The most parts of the mating projections 205, 205, . . . of the base cylinder 203 are kept in a projected condition from the outer side of the cylindrical portion 232 of the dust cover 231 (see FIGS. 10 and 11).

Therefore, the base cylinder 203 is supported by the vehicle body and the nozzle holder 220 is moved back and forth from a mounting hole 237 formed in the bumper 236. The mounting hole 237 is substantially rectangular with mating cutouts 237a and 237a formed on a pair of opposed edges. A mounting bracket 238 is used for supporting the base cylinder 203 with the vehicle body (see FIGS. 15 and 16).

The bracket 238 is formed integrally with a substantially cylindrical support cylinder 239, a mating coupling end portion 240 in the form of a substantially rectangular cylinder projected forward from the support cylinder 239, and mounting pieces 241 and 241 projected sideways from the side portion of the mating coupling end portion 240. Screw insertion holes 241a and 241a are formed in the respective mounting pieces 241 and 241 (see FIG. 16).

The support cylinder 239 has a first-half small diameter portion 242 and a second-half large diameter portion 243, and a stepped surface 244 directed backward is formed in the boundary portion between the two inner surfaces. Moreover, a plurality of mating holes 242a and 242a are formed at intervals in the circumferential direction of the small diameter portion 242, whereas a mating slit 243a opening in the rear end of the large diameter portion 43 is formed (see FIGS. 10 and 12).

Figure 13:
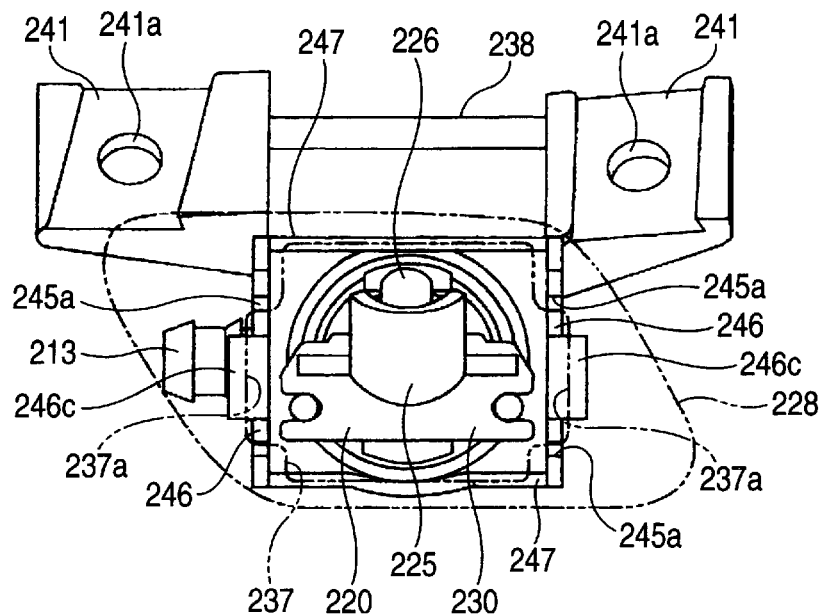
FIG. 13 is a partial cutaway elevational view of a headlamp cleaner embodying the invention.
Figure 14:
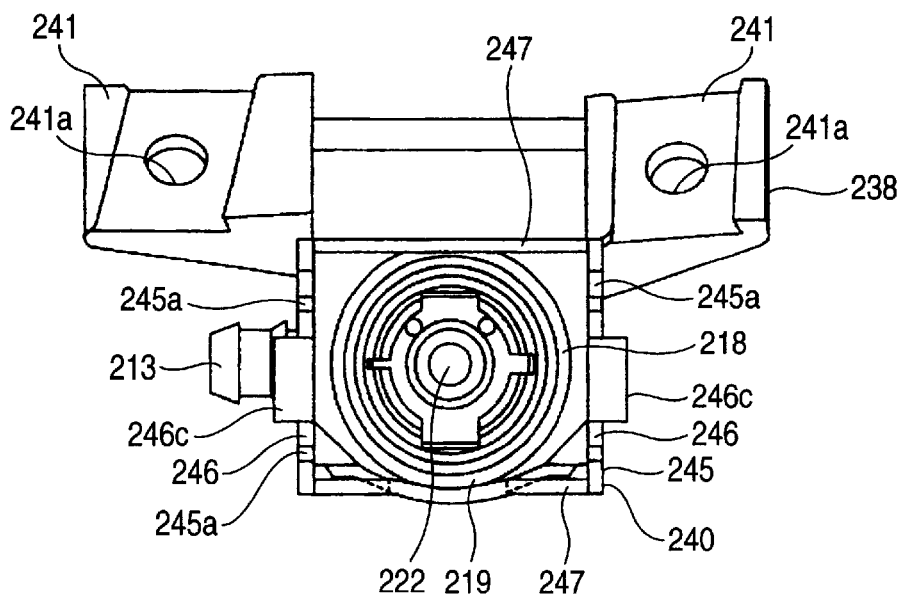
FIG. 14 is an elevational view with a nozzle holder removed.

The fixed contact end portion 240 is in the form of an angular cylinder that is rectangular in transverse cross section with double slits formed in a pair of opposed sides 245 and 245 out of the four sides, the double slits reaching the front ends of the sides. Elastic mating positioning portions 246 and 246 are formed between the double slits 245a and 245a. In this case, the front ends 245b, 245b, . . . in portions positioned on both sides of the mating positioning portions 246 and 246 out of the sides 245 and 245 are positioned slightly backward from the front ends of the mating positioning portions 246 and 246. Mating plate portions 246a and 246a are protruded forward from the front ends of the mating positioning portions 246 and 246, so that shoulder portions 246b and 246b are formed and 246a. Further, pawl portions 246c and 246c projecting forward are formed at the front ends of the mating plate portions 246a and 246a. The width of the pawl portions 246c and 246c is set smaller than the width of the mating plate portions 246a and 246a, and the rear sides of the pawl portions 246c and 246c are positioned on the same plane as that of the front ends of the mating plate portions 246a and 246a. Moreover, the width of the mating plate portions 246a and 246a is set substantially equal to that of the mating cutouts 237a and 237a formed in the mounting hole 237 of the bumper 236 (see FIGS. 13 and 16).

The space between the sides 245 and 245 where the mating positioning portions 246 and 246 are formed is set substantially equal to the space between a pair of edges where the mating cutouts 237a and 237a of the mounting hole 237 are formed, and the space between the outer sides of another pair of sides 247 and 247 is set slightly greater than the space between a pair of edges where the mating cutouts 237a and 237a of the mounting hole 237 are not formed. Further, the front ends 247a and 247a of the sides 247 and 247 are positioned forward from the front ends 245b and 245b of the sides 245 and 245 where the mating positioning portions 246 and 246 are formed (see FIGS. 13 and 16).

Then the front end portion of the base cylinder 203 of the headlamp cleaner 201 is inserted behind into the support cylinder 239 of the bracket. When the front end of the base cylinder 203 is inserted into the small-diameter portion 242 of the support cylinder 239, the protruded string 235 is squeezed out of shape by the inner peripheral surface of the small diameter portion 242 of the support cylinder 239 since the outer diameter of the protruded string 235 at the front end of the cylindrical portion 232 of the dust cover 231 is greater than the inner diameter of the small diameter portion 242 of the support cylinder 239, and the front end portion of the base cylinder 203 is inserted into the support cylinder 239 further. Ultimately, the mating projections 205, 205, . . . formed in the front end portion of the base cylinder 203 mate with the respective mating holes 232a, 232a, . . . of the support cylinder 239, whereby the bracket 238 is supported by the front end portion of the base cylinder 203. In this condition, the O-ring-like protruded string 234 formed at the rear end of the cylindrical portion 232 of the dust cover 231 is forced to contact the stepped surface 244 formed on the inner peripheral surface of the support cylinder 239 of the bracket 238. Consequently, as the space between the support cylinder 239 of the bracket 238 and the front end portion of the base cylinder 203 is such that the protruded string 235 in the front end portion of the dust cover 231 is forced to contact the inner peripheral surface of the support cylinder 239 and that the O-ring-like protruded string 234 at the rear end of the dust cover 231 is caused to elastically contact the stepped surface 244 of the support cylinder 239, any backlash between the base cylinder 203 and the support cylinder 239 of the bracket 238 is prevented (see FIGS. 10 and 11).

In this case, the positioning projection 206a of the base cylinder 203 is mated with the mating slit 243a of the bracket 238, so that the positioning of the bracket 238 of the headlamp cleaner 201 with respect to the rotational direction is carried out (see FIG. 12).

The headlamp cleaner 201 is mounted in the bumper 236 in the following way; incidentally, the nozzle holder 220 is removed before the mounting work is done. While alignment of the mating positioning portions 246 and 246 of the fixed contact end portion 240 of the bracket 238 with the mating cutouts 237a and 237a of the mounting hole 237 of the bumper 236 is checked, the fixed contact end portion 240 is brought close to the bumper 236 from the rear side of the bumper 236. While the mating positioning portions 246 and 246 are bent so that they are brought to close to each other, the pawl portions 246c and 246c are passed through the mating cutouts 237a and 237a. After the pawl portions 246c and 246c are passed through the mating cutouts 237a and 237a, the force of bending the mating positioning portions 246 and 246 is released to return the mating positioning portions 246 and 246 to the original condition, whereby the pawl portions 246c and 246c are mated with the front side edges of the mating cutouts 237a and 237a. Simultaneously, the mating plate portion 246a and 246a are mated with the mating cutouts 237a and 237a in a matched condition, and the shoulder portions 246b and 246b are brought into contact with the edge portions on the rear sides of both side portions of the mating cutouts 237a and 237a. Moreover, the front ends 247a and 247a of the other pair of sides 247 and 247 of the fixed contact end portion 240 are brought into contact with the rear side of the bumper 236 in a position close to the edges where the mating cutouts 237a and 237a of the mounting hole 237 are not formed (see FIGS. 12, 13 and 15).

The headlamp cleaner 201 is thus mounted in the mounting hole 237 of the bumper 236 via the bracket 238. More specifically, the headlamp cleaner 201 is mounted in the bumper 236 in such a condition that the open edge of the mounting hole 237 of the bumper 236 is held among the pawl portions 246c and 246c and the shoulder portions 246b and 246b provided on the pair of sides 245 and 245 and the front ends of the other pair of sides 247 and 247 of the fixed contact end portion 240 of the bracket 238.

Figure 15:
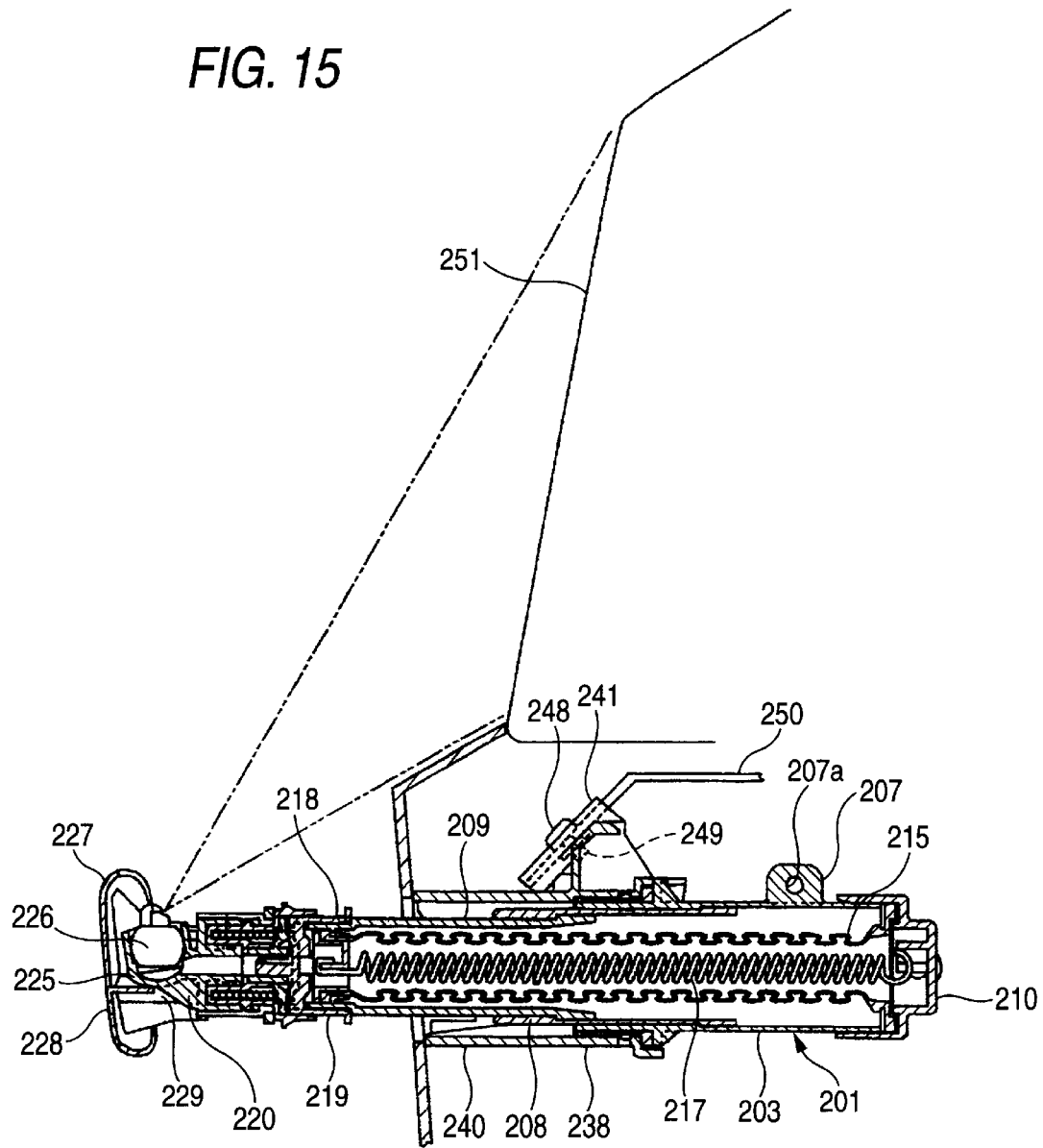
FIG. 15 is a vertical sectional view in an operating condition of a headlamp cleaner embodying the invention.
Figure 16:
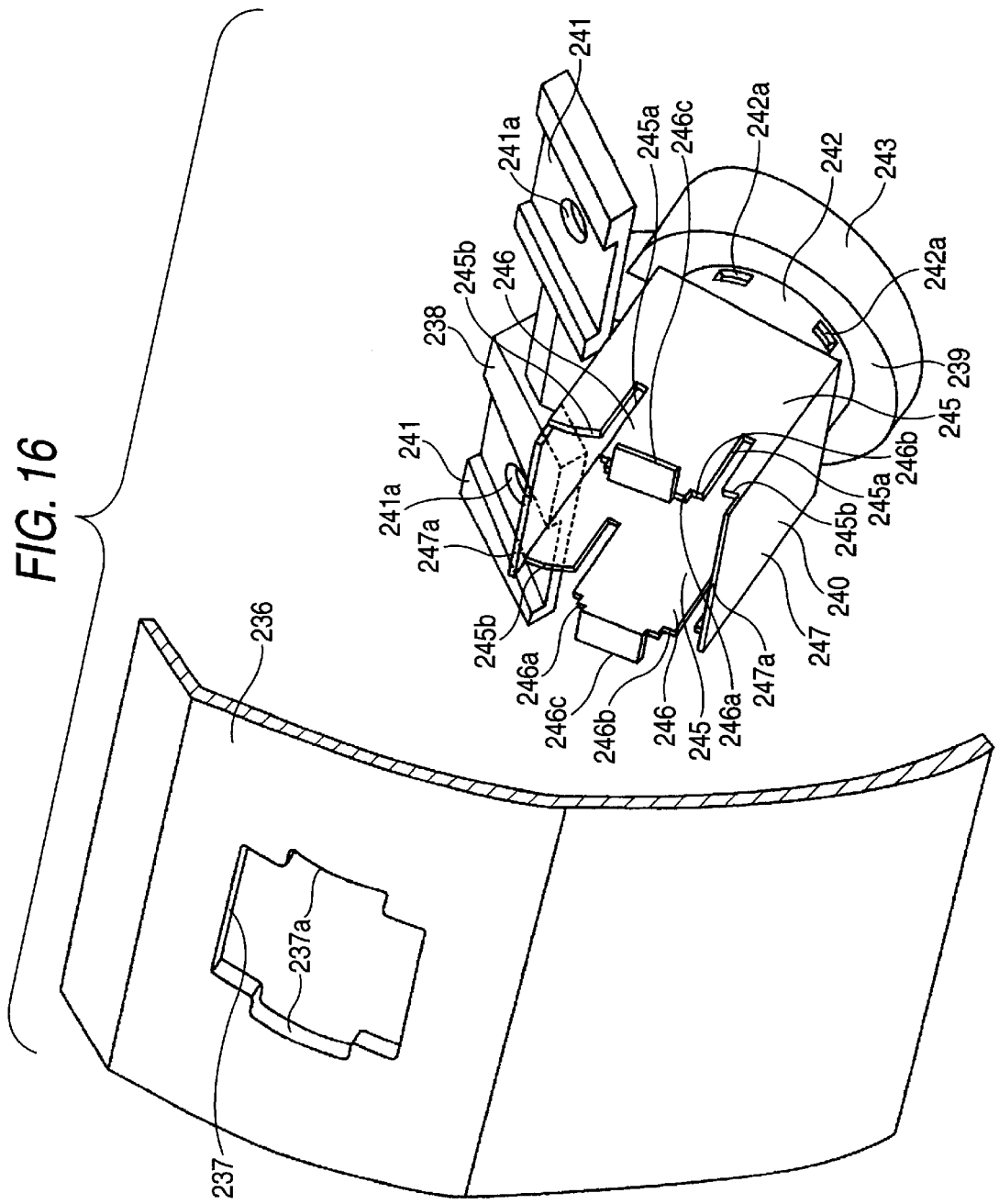

Then the mounting pieces 241 and 241 of the bracket 238 are fixed to part 250 of the vehicle body with mounting screws 248 and 248 passed through the screw insertion holes 241a and 241a and nuts 249 and 249 screwed onto the mounting screws 248 and 248 (see FIG. 15). Moreover, a mounting piece 207 formed on the base cylinder 203 is fixed to another part of the vehicle body with a mounting screw (not shown) passed through the screw insertion hole 207a and a nut screwed onto the mounting screw.

Further, the headlamp cleaner 201 is fixed to the vehicle body with the front end of the piston 209 and the injection nozzle 226 positioned with respect to the mounting hole 237 of the bumper 236.

In a retracted condition, as shown in FIG. 11, the pistons 208 and 209 are retracted into the base cylinder 203 by tensile force due to the contraction of the helical tension spring 217 and the nozzle holder 220 is positioned inside the mounting hole 237 of the bumper 236, so that the mounting hole 237 of the bumper 236 is covered with the cover body 228 of the nozzle cover 227. The coupling pipe portion 213 provided in the base edge portion of the base cylinder 203 is coupled to a motor pump (not shown), so that washing liquid is supplied by the motor pump to the base cylinder 203 via the coupling pipe portion 213 during the operation. The washing liquid thus supplied is passed through the boot 215 to reach the base edge portion of the check valve portion 219.

When the liquid pressure increases after the cleaning liquid is supplied into the base cylinder 203, the helical tension spring 217 is elongated by the liquid pressure and the first and second pistons 208 and 209 are projected from the base cylinder 203. Thus, the pistons 208 and 209 are extended up to a condition shown in FIG. 15, so that the injection nozzle 226 is allowed to reach a position where it is fit for use in washing the front cover 256 of the headlamp.

When the pressure of the washing liquid in the base edge portion of the check valve portion 219, that is, the liquid pressure applied to the diaphragm 222 has a predetermined value or greater, the choke spring 223 is compressed and the diaphragm 222 is deformed. Then the check valve 221 is opened and the washing liquid is jetted out of the injection nozzle 226 via the nozzle holder 220 toward the front cover 256 of the headlamp (see FIG. 15).

When the washing liquid is thus supplied, the shell cylinder 202 extends and the check valve 221 opens whereby to cause the washing liquid to be jetted out of the injection nozzle 226. Therefore, the spring force of the choke spring 223 is set lower than that of the helical tension spring 217. In this case, the washing liquid is not necessarily needed to be jetted out after the shell cylinder 202 is completely extended but may be jetted out while the shell cylinder 202 is extending as well.

As the liquid pressure lowers when the supply of the washing liquid is stopped, the check valve 221 is closed and the shell cylinder 202 contracts in the retracted condition shown in FIG. 11. Moreover, the mounting hole 237 of the bumper 236 is closed with the cover body 228 of the nozzle cover 227 provided to the nozzle holder 220.

In the structure for mounting a headlamp cleaner above, the headlamp cleaner 201 is fixed to the bumper 236 by fixing, to the mounting hole 237 of the bumper 236, the mating coupling end portion 240 of the bracket 238 positionally fixed to the headlamp cleaner 201 accurately to ensure that the front end portions of the pistons 208 and 209 and the injection nozzles 226 are properly positioned with respect to the mounting hole 237 of the bumper 236. Consequently, there is no fear of bringing the pistons 208 and 209 and the injection nozzle 226 into contact with the bumper 236.

The fixed contact end portion 240 of the bracket 238 can be fixed to the bumper 236 through only the simple work of joining the pawl portions 246c and 246c of the mating positioning portions 246 and 246 to the front side edges of the mating cutouts 237a and 237a of the mounting hole 237 of the bumper 236.

As the mating plate portions 246a and 246a of the mating positioning portions 246 and 246 mate with the mating cutouts 237a and 237a, the positioning of the fixed contact end portion 240 in the direction of the opening plane of the mounting hole 237 is carried out for certain. Moreover, the load applied to the bracket 238 is received by the mating plate portions 246a and 246a and the mating cutouts 237a and 237a, so that the load applied to the pawl portions 246c and 246c is reduced with the effect of making the pawl portions 246c and 246c become hardly damaged.

Further, the slits 245a, 245a, . . . are formed between the sides 245 and 245 where the mating positioning portions 246 and 246 of the fixed contact end portion 240 are provided and the mating positioning portions 246 and 246, whereby the elastic deformation of the mating positioning portions 246 and 246 in their planar direction is facilitated; therefore, it becomes easy to do the work of joining the pawl portions 246c and 246c provided at the front ends of the mating positioning portions 246 and 246 to the mating cutouts 237a and 237a of the bumper 236.

While the preferred form of the invention has been described by way of example, it is to be understood that the technical scope of the invention is not limited to the specific embodiment thereof and that various changes in the shape and arrangement of parts may be resorted to without departing from the spirit thereof.

As is obvious from the description given above, the structure for mounting a headlamp cleaner according to the invention, including the pistons having the nozzle cover and the injection nozzle at the front ends, and the cylinder for moving the pistons back and forth from the bumper, is characterized by the cylinder mounted in the bumper via the bracket having the mating pieces which mate with the mounting hole provided in the bumper and the projected positioning pieces which are inserted into the mounting hole and used for positioning the bracket with respect to the planar horizontal direction.

Therefore, in the structure for mounting a headlamp cleaner according to the invention, the cylinder is mounted in the bumper via the bracket, and the positioning of the bracket with respect to the planar horizontal direction is carried out to ensure that the cylinder is positioned in the mounting hole of the bumper via the bracket, so that the pistons or the injection nozzle supported by the pistons never interfere with the bumper.

As the bracket is mounted in the bumper by mating the mating pieces provided in the bracket with the mounting hole of the bumper, the mounting of the cylinder in the bumper is facilitated.

Further, according to the invention, since the positioning projections are provided on both sides of the mating pieces in such a manner as to be adjacent to the respective mating pieces, the load applied to the bracket at the time the bracket is mounted in the bumper is received by the positioning projections and the mounting hole, so that the load applied to the mating pieces is reduced with the effect of making the mating pieces become hardly damaged.

Further, according to the invention, since the slit is positioned between the positioning projection and the mating piece, whereby the elastic deformation of the mating pieces in their planar direction is facilitated; therefore, the mating pieces become easily joined to the mounting hole.

Further, according to the invention, since the mounting hole has the mating protrusions and the mating piece has the mating hole with which the mating protrusion mates, the positioning of both the mating hole and mating protrusion in the longitudinal direction can simultaneously be carried out.

Another structure for mounting a headlamp cleaner according to the invention, including the pistons having the nozzle cover and the injection nozzle at the front ends, and the cylinder for moving the pistons back and forth from the bumper, is characterized in that the bracket fixed to the cylinder has the mating pieces which mate with the mounting hole of the bumper and that the bracket is mounted in the bumper via the elastic members.

In the above structure for mounting a headlamp cleaner according to the invention, the repulsion force of the elastic members has an effect on the mating portions between the mating pieces and the mounting hole. Consequently, the mounting condition of the bracket in the bumper is stabilized as the mating of the mating pieces with the mounting hole becomes hardly released.

Further, according to the invention, since the elastic member is annular in shape including a polygonal external form and disposed between the inner open edge of the mounting hole and part of the bracket, the repulsion force produced in the elastic member can equally be applied to the bracket.

Moreover, as is obvious from the description given above, the structure for mounting a headlamp cleaner according to the invention, the headlamp cleaner including the pistons having the nozzle cover and the injection nozzle at the front ends, and the cylinder for moving the pistons back and forth from the bumper, is characterized in that the bumper is provided with the substantially rectangular mounting hole having the rectangular mating cutouts; the cylinder is provided with the bracket having the rectangular cylindrical fixed contact end portion which is fixed to the mounting hole; the pawl portions projecting outward from the mounting hole and mating with the edge faces of the mating cutouts are provided on a pair of sides out of four sides of the fixed contact end portion, and the mating positioning portions having mating plate portions mating with the mating cutouts for positioning with respect to the mounting hole in three planar directions; and another pair of sides having open width wider than that of the mounting hole are used as contact end portions for holding the bumper together with the pawl portions by directly contacting the inside of the mounting hole.

Therefore, in the structure for mounting a headlamp cleaner according to the invention, the bracket can be mounted in the bumper only by mating the pawl portions of the mating positioning portions with the edge faces of the mating cutouts of the mounting hole of the bumper. As the mating plate portions of the mating positioning portions are simultaneously mated with the mating cutouts for positioning in the planar direction of the mounting hole, the mounting and positioning of the headlamp cleaner of the headlamp cleaner can also be carries out simply and simultaneously.

Moreover, as the load applied to the bracket is received by the mating plate portions and the mating cutouts, the load applied to the pawl portions is reduced with the effect of making the pawl portions become hardly damaged.

Further, according to the invention, as the mating positioning portions are such that the slits are formed between both side portions and the fixed contact end portion, and the fixed contact end portion is capable of elastically curving in the inside and outside directions of the fixed contact end portion, it becomes easy to do the work of joining the pawl portions provided at the front ends of the mating positioning portions to the mating cutouts of the bumper.

What is claimed is:

1. A structure for mounting a headlamp cleaner including a piston having a nozzle cover and an injection nozzle at a front end thereof, and a cylinder for moving the piston back and forth with respect to a bumper, said structure comprising:
    a mounting hole provided in the bumper; and
    a bracket including a mating portion which mates with a mounting hole,
    wherein the cylinder is mounted in the bumper via the bracket.

2. The structure for mounting a headlamp cleaner according to claim 1,
    wherein the mating portion of the bracket is an elastic mating piece.

3. The structure for mounting a headlamp cleaner according to claim 1,
    wherein the bracket further includes a positioning projection which is inserted into the mounting hole and positions the bracket with respect to a planar horizontal direction of the mounting hole.

4. The structure for mounting a headlamp cleaner according to claim 3,
    wherein a plurality of the positioning projections are provided on both sides of the mating portion and adjacent to the mating portion.

5. The structure for mounting a headlamp cleaner according to claim 3,
    wherein a slit is provided between the positioning projection and the mating portion.

6. The structure for mounting a headlamp cleaner according to claim 3,
    wherein the mounting hole includes a mating protrusion and the mating portion includes a mating hole with which the mating protrusion mates.

7. The structure for mounting a headlamp cleaner according to claim 1, further comprising:
    an elastic member via which the bracket is mounted in the bumper.

8. The structure for mounting a headlamp cleaner according to claim 7,
    wherein the elastic member is annular in shape having a polygonal external form and disposed between an inner open edge of the mounting hole and a part of the bracket.

9. The structure for mounting a headlamp cleaner according to claim 1,
    wherein the mounting hole includes rectangular mating cutouts, and
    wherein a bracket further includes a rectangular cylindrical fixed contact end portion which is fixed to the mounting hole and includes a first pair of sides and a second pair of sides, and
    wherein the mating portion is a pawl portion which is provided on the first pair of sides and projects outward from the mounting hole and mates with edge faces of the mating cutout, and
    wherein the fixed contact end portion includes mating positioning portion provided on the first pair of sides and having a mating plate portion which mates with the mating cutout for positioning the bracket with respect to three planar directions of the mounting hole, and
    wherein the second pair of sides has open width wider than that of the mounting hole and is provided with a contact end portion which holds the bumper together with the pawl portion by contacting an inside of the mounting hole.

10. The structure for mounting a headlamp cleaner according to claim 9,
    wherein a slit is formed between a side portion of the mating positioning portion and the fixed contact end portion, and
    wherein the fixed contact end portion is capable of elastically curving by the slit in one of an inside direction and an outside direction of the fixed contact end portion.

11. The structure for mounting a headlamp cleaner according to claim 10,
    wherein the fixed contact end portion elastically curves when the pawl portion mates with the edge faces of the mating cutout of the bumper.

* * * * *

UNITED STATES PATENT AND TRADEMARK OFFICE
CERTIFICATE OF CORRECTION

PATENT NO. : 6,793,153 B2
DATED : September 21, 2004
INVENTOR(S) : Hitoshi Hirose et al.

It is certified that error appears in the above-identified patent and that said Letters Patent is hereby corrected as shown below:

<u>Title page,</u>
Item [30], Foreign Application Priority Data, please add:
-- [30] Foreign Application Priority Data

Dec. 25, 2001   (JP)..........2001-391402
Dec. 25, 2001   (JP)..........2001-391403 --

Signed and Sealed this

Twenty-eighth Day of December, 2004

JON W. DUDAS
*Director of the United States Patent and Trademark Office*